US010723479B2

(12) United States Patent
Anderson et al.

(10) Patent No.: US 10,723,479 B2
(45) Date of Patent: Jul. 28, 2020

(54) SYNTHETIC AIR DATA OUTPUT GENERATION

(71) Applicant: Rosemount Aerospace Inc., Burnsville, MN (US)

(72) Inventors: Kaare Josef Anderson, Farmington, MN (US); Brian Daniel Matheis, Lakeville, MN (US); Derrick D. Hongerholt, New Market, MN (US); William Kunik, Lakeville, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 204 days.

(21) Appl. No.: 15/897,537

(22) Filed: Feb. 15, 2018

(65) Prior Publication Data

US 2018/0170572 A1  Jun. 21, 2018

Related U.S. Application Data

(63) Continuation of application No. 14/962,137, filed on Dec. 8, 2015, now Pat. No. 9,932,127.

(51) Int. Cl.
| B64D 43/02 | (2006.01) |
| G07C 5/08 | (2006.01) |
| G06N 3/04 | (2006.01) |
| G01C 21/16 | (2006.01) |
| G01P 5/16 | (2006.01) |
| G01P 13/02 | (2006.01) |
| G01P 21/02 | (2006.01) |

(52) U.S. Cl.
CPC ......... *B64D 43/02* (2013.01); *G01C 21/165* (2013.01); *G01P 5/16* (2013.01); *G01P 13/025* (2013.01); *G01P 21/025* (2013.01); *G06N 3/04* (2013.01); *G07C 5/0808* (2013.01)

(58) Field of Classification Search
CPC .............................. B60W 40/09; B60W 40/10
USPC ........................................................... 701/1
See application file for complete search history.

(56) References Cited

U.S. PATENT DOCUMENTS

| 4,300,200 A | 11/1981 | Doe |
| 6,466,888 B1 | 10/2002 | McCool et al. |
| 6,561,020 B2 | 5/2003 | Glenney |
| 7,257,470 B2 | 8/2007 | Hongerholt et al. |
| 8,761,970 B2 | 6/2014 | McIntyre et al. |
| 8,857,255 B2 | 10/2014 | Anderson et al. |
| 8,914,164 B1 | 12/2014 | Nathan et al. |

(Continued)

FOREIGN PATENT DOCUMENTS

EP          1256811 A1    11/2002

OTHER PUBLICATIONS

Extended European Search Report for European Patent Application No. 16201353.6, dated Feb. 10, 2017, 9 pages.

*Primary Examiner* — Thomas G Black
*Assistant Examiner* — Luat T Huynh
(74) *Attorney, Agent, or Firm* — Kinney & Lange, P.A.

(57) ABSTRACT

In one example, a method includes receiving, over an aircraft data communications bus, a plurality of non-pneumatic inputs corresponding to aircraft operational parameters. The method further includes processing the plurality of non-pneumatic inputs through an artificial intelligence network to generate an air data output value, and outputting the air data output value to a consuming system for use when a pneumatic-based air data output value is determined to be unreliable.

20 Claims, 3 Drawing Sheets

(56) References Cited

U.S. PATENT DOCUMENTS

| | | | |
|---|---|---|---|
| 9,096,330 B2 | 8/2015 | Nathan et al. | |
| 2007/0130096 A1* | 6/2007 | Selvig | G01P 5/14 |
| | | | 706/45 |
| 2011/0184592 A1* | 7/2011 | Elias | G01C 23/00 |
| | | | 701/7 |
| 2013/0204544 A1 | 8/2013 | Thomas | |
| 2014/0330455 A1* | 11/2014 | McIntyre | G01P 5/16 |
| | | | 701/3 |
| 2015/0100184 A1* | 4/2015 | Nathan | G01C 23/00 |
| | | | 701/7 |

* cited by examiner

SYNTHETIC AIR DATA OUTPUT GENERATION

CROSS-REFERENCE TO RELATED APPLICATION(S)

This application is a continuation of U.S. application Ser. No. 14/962,137 filed Dec. 8, 2015 for "SYNTHETIC AIR DATA OUTPUT GENERATION" by Kaare Josef Anderson, Brian Daniel Matheis, Derrick D Hongerholt, and William Kunik.

BACKGROUND

The present disclosure relates generally to air data systems, and more particularly to air data systems that can utilize artificial intelligence to generate air data outputs for an aircraft.

Modern aircraft often incorporate air data systems that calculate air data outputs based on measured parameters collected from various sensors positioned about the aircraft. For instance, many modern aircraft utilize pneumatic air data probes that measure pitot pressure, static pressure, or other parameters of airflow across the probe. Such pneumatic air data probes often include one or more air data sensing ports, such as static pressure ports and/or total pressure (i.e., stagnation pressure) ports. A portion of air flowing over the probes is diverted to the ports that are pneumatically connected to pressure sensors that sense the atmospheric pressure outside the aircraft. Such measured pressures are usable for determining air data outputs, such as aircraft pressure altitude, altitude rate (e.g., vertical speed), airspeed, Mach number, angle of attack, angle of sideslip, or other air data outputs.

To increase system reliability, aircraft manufacturers typically incorporate redundant (e.g., backup) systems that can provide outputs to consuming systems in the event that a primary system fails or is otherwise determined to be unreliable. For instance, many aircraft incorporate multiple (e.g., two, three, four, or more) pneumatic air data probes, certain of which are designated as backup systems for use when a primary system is deemed unreliable.

SUMMARY

In one example, a method includes receiving, over an aircraft data communications bus, a plurality of non-pneumatic inputs corresponding to aircraft operational parameters. The method further includes processing the plurality of non-pneumatic inputs through an artificial intelligence network to generate an air data output value, and outputting the air data output value to a consuming system for use when a pneumatic-based air data output value is determined to be unreliable.

In another example, a synthetic air data system includes at least one processor and computer-readable memory. The computer-readable memory is encoded with instructions that, when executed by the at least one processor, cause the synthetic air data system to receive, over an aircraft data communications bus, a plurality of non-pneumatic inputs corresponding to aircraft operational parameters. The computer readable memory is further encoded with instructions that, when executed by the at least one processor, cause the synthetic air data system to process the plurality of non-pneumatic inputs through an artificial intelligence network to generate an air data output value, and output the air data output value to a consuming system for use when a pneumatic-based air data output value is determined to be unreliable.

DETAILED DESCRIPTION

As described herein, a synthetic air data system can process a plurality of non-pneumatic inputs through an artificial intelligence network to generate one or more air data output values. Such non-pneumatic inputs can include, among others, aircraft thrust parameters, aircraft engine throttle settings, flight control surface positions and/or surface loading parameters, aircraft remaining fuel weight and/or usage rates, aircraft weight, landing gear position (e.g., deployed or stowed), aircraft mass balance, and aircraft acceleration and/or angular rates (e.g., received from an inertial reference system). The artificial intelligence network, such as an artificial neural network, can correlate the received inputs to one or more air data output values, such as airspeed, altitude, Mach number, angle of attack, angle of sideslip, or other air data output values. As such, a synthetic air data system implementing techniques of this disclosure can generate air data output values via a system that is dissimilar in design to traditional direct-measurement systems (e.g., pneumatic-based, optical, ultrasonic, or other sensor-based systems that directly measure the air data value) and that can be used, e.g., when a sensor-based air data output value, such as a pneumatic-based air data output value, is determined to be unreliable. Moreover, such air data output values can be generated from measured inputs that are provided by existing aircraft systems, thereby decreasing the time and cost required to install additional sensors or hardware components on new and existing aircraft platforms when incorporating the synthetic air data system.

Figure 1:
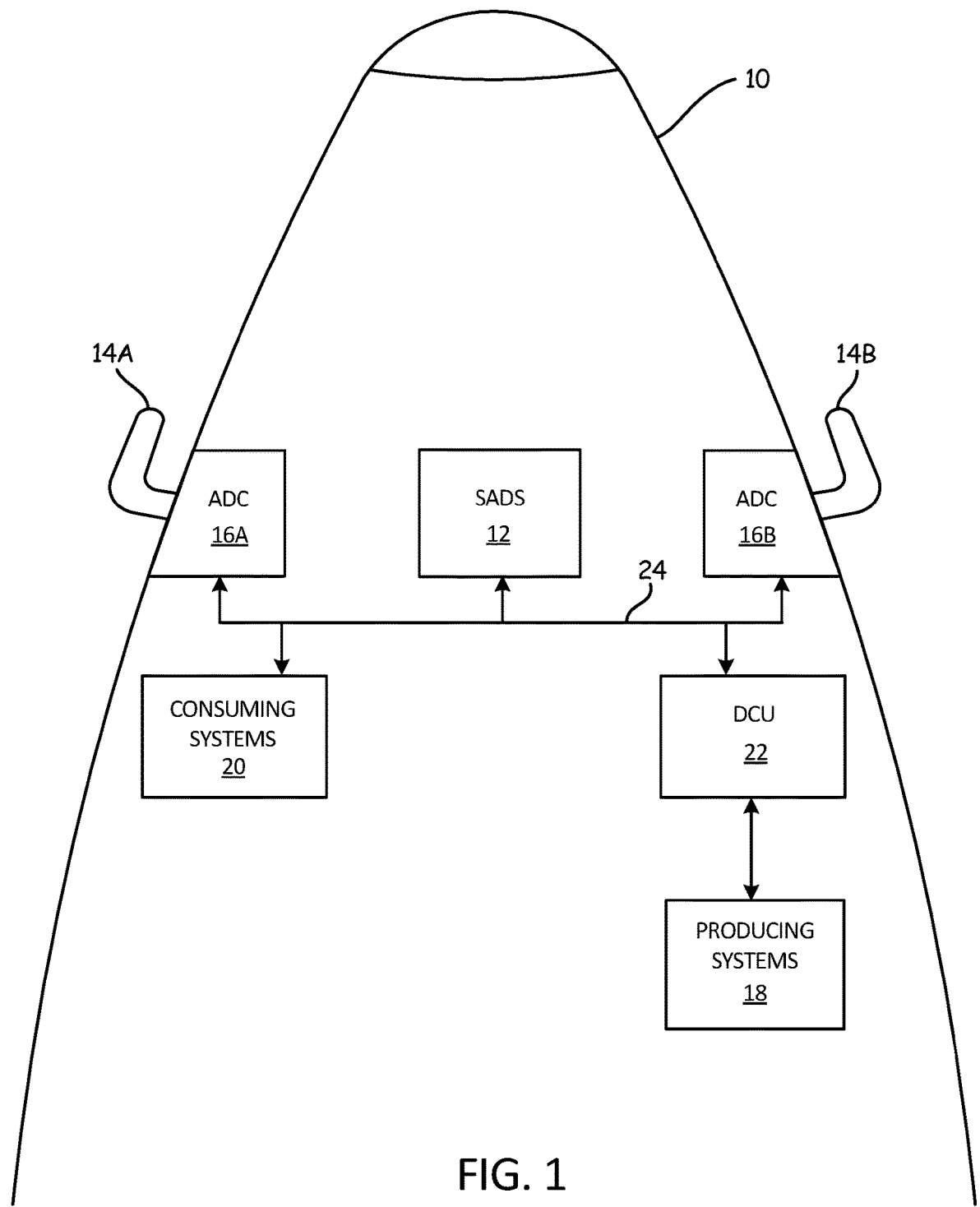
FIG. 1 is a schematic block diagram of an example aircraft including a synthetic air data system that can process non-pneumatic inputs through an artificial intelligence network to generate one or more air data output values.

FIG. 1 is a schematic block diagram of aircraft 10 including synthetic air data system 12 that can process non-pneumatic inputs through an artificial intelligence network to generate one or more air data output values. As illustrated in FIG. 1, aircraft 10 can further include pneumatic air data probe 14A and pneumatic air data probe 14B (collectively referred to herein as "pneumatic air data probes 14"), air data computer (ADC) 16A and air data computer 16B (collectively referred to herein as "air data computers 16"), producing systems 18, consuming systems 20, and data concentrator unit (DCU) 22.

Pneumatic air data probes 14 are positioned at an exterior of aircraft 10 to sense one or more pressures of air flowing over the probes. Pneumatic air data probes 14 include one or more air data sensing ports (not illustrated) to which airflow around pneumatic air data probes 14 is diverted. The air data sensing ports are pneumatically connected to pressure sensors (e.g., pressure transducers or other pressure sensors)

that measure the collected airflows to generate measured pressures that are usable in determining, e.g., static pressure, total pressure (i.e., stagnation pressure), or other pressures of the airflow around aircraft 10. Outputs of the pressure sensors are electrically connected to air data computers 16, which generate air data output values based on the received pneumatic pressures.

As illustrated in FIG. 1, air data computer 16A is adjacent pneumatic air data probe 14A and air data computer 16B is adjacent pneumatic air data probe 14B. In other examples, air data computers 16 need not be adjacent air data probes 14. For instance, air data computers 16 can be located within the interior of aircraft 10 at a location that is remote from pneumatic air data probes 14, such as within an electronics bay of aircraft 10. In addition, while illustrated as including two pneumatic air data probes 14 and two corresponding air data computers 16, aspects of this disclosure are not so limited. For instance, in other examples, aircraft 10 can include more or fewer than two of each of pneumatic air data probes 14 and air data computers 16, and the number of air data computers 16 need not match the number of pneumatic air data probes 14. In general, aircraft 10 includes one or more air data computers 16 that are electrically and/or communicatively coupled with one or more air data probes 14 to receive indications of measured pneumatic pressures (e.g., static pressure and total pressure) of airflow around the exterior of aircraft 10 sensed by the one or more pneumatic air data probes 14.

Air data computers 16 house electrical components, such as one or more processors, computer-readable memory, or other electrical components configured to generate air data outputs corresponding to one or more operational states of aircraft 10. Non-limiting examples of such air data outputs include calibrated airspeed, true airspeed, Mach number, altitude (e.g., pressure altitude), angle of attack (i.e., an angle between oncoming airflow or relative wind and a reference line of a wing of aircraft 10), vertical speed (e.g., altitude rate), and angle of sideslip (i.e., an angle between a direction of travel and a direction extending through a nose of aircraft 10). Accordingly, air data outputs generated by air data computers 16 based on pneumatic pressures received by pneumatic air data probes 14 can be considered to be pneumatic-based air data outputs.

As further illustrated in FIG. 1, aircraft 10 includes producing systems 18. Producing systems 18 include operational systems of aircraft 10 that produce non-pneumatic outputs usable by synthetic air data system 12 as inputs to generate air data output values, as is further described below. For example, producing systems 18 can include aircraft engines and/or thrust control systems, aircraft fuel systems, flight management control systems, aircraft navigational systems such as inertial reference systems (IRS), attitude heading and reference systems (AHARS), global positioning system (GPS) and/or satellite information systems, landing gear systems, or other operational systems of aircraft 10. Producing systems 18, as illustrated, are communicatively coupled with data concentrator unit (DCU) 22.

Data concentrator unit 22 is an electronic device comprising one or more processors, computer-readable memory, and data transceivers configured to receive digital and/or analog signals from various aircraft systems and format the received signals for transmission according to a defined communications protocol, such as the protocol defined by the Aeronautical Radio, Incorporated (ARINC) 429 standard. For instance, as illustrated in FIG. 1, data concentrator unit 22 can receive inputs from producing systems 18 and can transmit the inputs over communications data bus 24 for receipt by one or more aircraft systems, such as synthetic air data system 12, air data computers 16, consuming systems 20, or other systems of aircraft 10. Communications data bus 24 can be any data bus that communicatively couples components of aircraft 10 and enables communication between the interconnected components via a defined communications protocol (e.g., ARINC 429).

Consuming systems 20 can be any operational system of aircraft 10 configured to receive air data output values from air data computers 16 and/or synthetic air data system 12 for use during operation of aircraft 10. For instance, consuming systems 20 can include any one or more of flight management systems, automatic flight control systems, aircraft display systems (e.g., primary flight displays, multifunction displays, control display units, or other display systems), or other operational systems of aircraft 10 that can utilize the received air data output values during operation of aircraft 10. In some examples, certain aircraft systems can be included in both producing systems 18 and consuming systems 20. For instance, a flight management computer can be included as one of producing systems 18 that outputs a calculated aircraft mass balance, remaining fuel, fuel usage rate, aircraft altitude, or other non-pneumatic outputs that are utilized by synthetic air data system 12 for generation of one or more air data output values. In addition, the flight management computer can be included as one of consuming systems 20 that receives generated air data output values from synthetic air data system 12 for use when a pneumatic-based air data output value determined by, e.g., one or more of air data computers 16 is determined to be unreliable. Accordingly, producing systems 18 and consuming systems 20 can each include any one or more aircraft systems, and the respective systems need not be unique to either of producing systems 18 and consuming systems 20.

As illustrated in FIG. 1, synthetic air data system 12 is communicatively connected to air data computers 16, consuming systems 20, and data concentrator unit 22 via communications data bus 24. However, while in the example of FIG. 1 synthetic air data system 12 is communicatively connected to producing systems 18 via data concentrator unit 22, in other examples, synthetic air data system 12 can be directly connected (e.g., communicatively and/or electrically connected) to any one or more of producing systems 18.

Synthetic air data system 12 can include one or more processors and computer readable memory encoded with instructions that, when executed by the one or more processors, cause synthetic air data system 12 to operate in accordance with techniques described herein. Synthetic air data system 12, in some examples, can include one or more stand-alone electronic devices, such that synthetic air data system is separate from air data computers 16 and each of consuming systems 20. In other examples, synthetic air data system 12 can be included in any one or more of air data computers 16 and/or consuming systems 20, such that functionality attributed herein to synthetic air data system 12 is performed by and/or distributed among one or more electronic devices of such other systems. For instance, in some examples, any one or more of air data computers 16 can implement functionality attributed herein to synthetic air data system 12. In general, synthetic air data system 12 includes one or more processors and computer readable memory encoded with instructions that, when executed by the one or more processors, cause synthetic air data system 12 to process received non-pneumatic inputs through an artificial intelligence network to generate an air data output value.

Examples of one or more processors of synthetic air data system 12 can include any one or more of a microprocessor, a controller (e.g., microcontroller), a digital signal processor (DSP), an application specific integrated circuit (ASIC), a field-programmable gate array (FPGA), or other equivalent discrete or integrated logic circuitry. Computer readable memory of synthetic air data system 12 can be configured to store information within synthetic air data system 12 during operation. Such computer-readable memory, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, the computer-readable memory is a temporary memory, meaning that a primary purpose of the computer-readable memory is not long-term storage. Computer-readable memory, in some examples, includes and/or is described as volatile memory, meaning that the computer-readable memory does not maintain stored contents when power to synthetic air data system 12 is removed. Examples of volatile memories can include random access memories (RAM), dynamic random access memories (DRAM), static random access memories (SRAM), and other forms of volatile memories. In some examples, computer-readable memory is used to store program instructions for execution by one or more processors of synthetic air data system 12. Computer-readable memory, in one example, is used by software or applications executing on synthetic air data system 12 to temporarily store information during program execution.

Computer-readable memory of synthetic air data system 12, in some examples, also includes one or more computer-readable storage media. Computer-readable storage media can be configured to store larger amounts of information than volatile memory. Computer-readable storage media can be configured for long-term storage of information. In some examples, computer-readable storage media include non-volatile storage elements. Examples of such non-volatile storage elements can include magnetic hard discs, optical discs, floppy discs, flash memories, or forms of electrically programmable memories (EPROM) or electrically erasable and programmable (EEPROM) memories.

In operation, synthetic air data system 12 receives, over communications data bus 24, non-pneumatic inputs corresponding to aircraft operational parameters. For instance, in the example of FIG. 1, synthetic air data system 12 can receive a plurality of non-pneumatic inputs from producing systems 18 via data concentrator unit 22 and communications data bus 24. Examples of such non-pneumatic inputs can include, but are not limited to, inputs corresponding to aircraft control surface position (e.g., ailerons, elevator, rudder, spoilerons, flaps, slats, or other control surfaces) and/or control surface loading, aircraft mass and/or mass balance (e.g., current and/or at a predefined time, such as at takeoff), remaining fuel weight, engine thrust parameters (e.g., engine N1, N2, EGT, throttle settings, or other thrust parameters), aircraft navigational information (e.g., aircraft position, heading, altitude, ground speed, airspeed, or other navigational information), air temperature information (e.g., static air temperature, total air temperature, outside air temperature, or other temperature information), aircraft acceleration and/or angular rate information (e.g., received from an IRS), landing gear position information (e.g., deployed, stowed, in transit, or other landing gear position information), or other non-pneumatic inputs. In general, non-pneumatic inputs can include any input indicative of an aircraft operational state received from a non-pneumatic source (e.g., sources other than pneumatic air data probes 14).

Synthetic air data system 12 processes the plurality of non-pneumatic inputs through an artificial intelligence network to generate one or more air data output values (e.g., calibrated airspeed, true airspeed, Mach number, pressure altitude, angle of attack, angle of sideslip, or other air data output values). Examples of such artificial intelligence networks include artificial neural networks, probabilistic graphical models such as Bayesian networks, probabilistic classifiers and/or controllers (e.g., Gaussian mixture models), or other forms of artificial intelligence networks. As one example, the artificial intelligence network can be an artificial neural network having at least one internal layer of nodes (often referred to as a hidden layer of neurons) that apply one or more weights, biases, and/or transfer functions to the plurality of non-pneumatic inputs to correlate the plurality of non-pneumatic inputs to one or more air data output values.

In some examples, the artificial intelligence network can be pre-trained based on previously-obtained data (e.g., flight test data) to correlate the plurality of non-pneumatic inputs to the one or more air data output values. In certain examples, synthetic air data system 12 can utilize a single artificial intelligence network to generate a plurality of air data output values from a plurality of non-pneumatic inputs. In other examples, synthetic air data system 12 can utilize multiple, separate artificial intelligence networks that each correlate a particular set of non-pneumatic inputs to a selected air data output value. For instance, synthetic air data system 12 can utilize a first artificial intelligence network that correlates a first set of non-pneumatic inputs to a first air data output value (e.g., angle of attack), and can utilize a second artificial intelligence network that correlates a second set of non-pneumatic inputs to a second air data output value (e.g., angle of sideslip). The first and second sets of non-pneumatic inputs can be the same or difference sets of inputs.

In certain examples, such as when the artificial intelligence network is an artificial neural network, the weights, biases, and transfer functions of the hidden layer of neurons can be pre-defined (e.g., via offline pre-training) and fixed, such that synthetic air data system 12 does not modify the weights, biases, and transfer functions during operation of synthetic air data system 12. In other examples, synthetic air data system 12 can incorporate an active training (or "learning") mode in which synthetic air data system 12 modifies the weights, biases, and transfer functions applied by the neurons based on feedback of the generated air data output and a reference value, such as a pneumatic-based air data output value. That is, in certain examples, synthetic air data system 12 can receive as input one or more pneumatic-based air data outputs generated by, e.g., air data computers 16 via measured pressures received from pneumatic air data probes 14. In such examples, synthetic air data system 12 can effectively train the artificial intelligence network based on non-pneumatic inputs received from producing systems 18 and pneumatic-based air data outputs generated by, e.g., air data computers 16.

In certain examples, synthetic air data system 12 can identify whether the received pneumatic-based air data output value is determined to be reliable. For instance, synthetic air data system 12 can receive a status indication or other indication of reliability of the pneumatic-based air data output value from e.g., air data computers 16 or one or more of consuming systems 20, such as a flight management computer, automatic flight control system, or other of consuming systems 20. In other examples, synthetic air data system 12 can determine whether the received pneumatic-based air data output value is reliable, such as by comparing pneumatic-based air data output values received from multiple sources (e.g., multiple of air data computers 16) to each other or to a threshold value. Synthetic air data system 12 can process the non-pneumatic inputs and the received pneumatic-based air data output through the artificial intelligence network to generate the air data output value (and optionally train the artificial neural network) when the pneumatic-based air data output value is determined to be reliable. Synthetic air data system 12 can process the non-pneumatic inputs alone (i.e., without processing the received pneumatic-based air data output value) through the artificial intelligence network to generate the air data output value when the received pneumatic-based air data output value is determined to be unreliable.

Such active training can enable synthetic air data system 12 to maintain and/or initialize dynamic internal states of the artificial neural network. In addition, active training and/or comparison of the air data outputs generated by synthetic air data system 12 to received pneumatic-based air data outputs can enable synthetic air data system 12 to determine an estimated error of the air data outputs generated by synthetic air data system 12. In certain examples, synthetic air data system 12 can generate an indication of reliability of the air data outputs generated by synthetic air data system 12 based on the comparison.

Synthetic air data system 12 can output the generated air data output value (i.e., generated by synthetic air data system 12) to one or more of consuming systems 20 (e.g., via communications data bus 24) for use when a pneumatic-based air data output value is determined to be unreliable. In some examples, synthetic air data system 12 can determine whether the pneumatic-based air data output value is unreliable, such as by comparing received pneumatic-based air data outputs to each other and/or to a threshold deviation parameter. In other examples, one or more of consuming systems 20 (e.g., a flight management system) can determine the reliability of the pneumatic-based air data output value, and can designate the air data output value generated by synthetic air data system 12 for use when the pneumatic-based air data output value is determined to be unreliable.

In certain examples, the air data output value generated by synthetic air data system 12 can be utilized to determine whether the pneumatic-based air data output value is reliable. For instance, synthetic air data system 12 and/or one or more of consuming systems 20 can compare pneumatic-based air data outputs to the air data output(s) generated by synthetic air data system 12. A pneumatic-based air data output can be determined to be unreliable when, e.g., a corresponding pneumatic-based air data output received from a first one of air data computers 16 is within a threshold deviation from the air data output generated by synthetic air data system 12 and the pneumatic-based air data output received from a second one of air data computers 16 exceeds the threshold deviation from the air data output generated by synthetic air data system 12. In such an example, the pneumatic-based air data output received from the first one of air data computers 16 (that is within the threshold deviation from the air data output generated by synthetic air data system 12) can be determined to be reliable. The pneumatic-based air data output received from the second one of air data computers 16 (that exceeds the threshold deviation) can be determined to be unreliable.

Consuming systems 20 can utilize one or more air data outputs generated by synthetic air data system 12 for operation when corresponding pneumatic-based air data outputs are determined to be unreliable. As such, synthetic air data system 12 can provide a redundant (e.g., backup) air data system that generates air data output values usable for operation of aircraft 12 when one or more pneumatic-based air data output values are determined to be unreliable. The air data output values generated by synthetic air data system 12 can be based on non-pneumatic source inputs, thereby providing an air data system that is dissimilar in design to the pneumatic-based air data systems and enhancing operational reliability of aircraft 10. Moreover, the non-pneumatic inputs received and processed by synthetic air data system 12 can be selected from inputs available on new and existing aircraft platforms, thereby reducing the time and cost required to incorporate synthetic air data system 12 into such aircraft designs.

Figure 2:
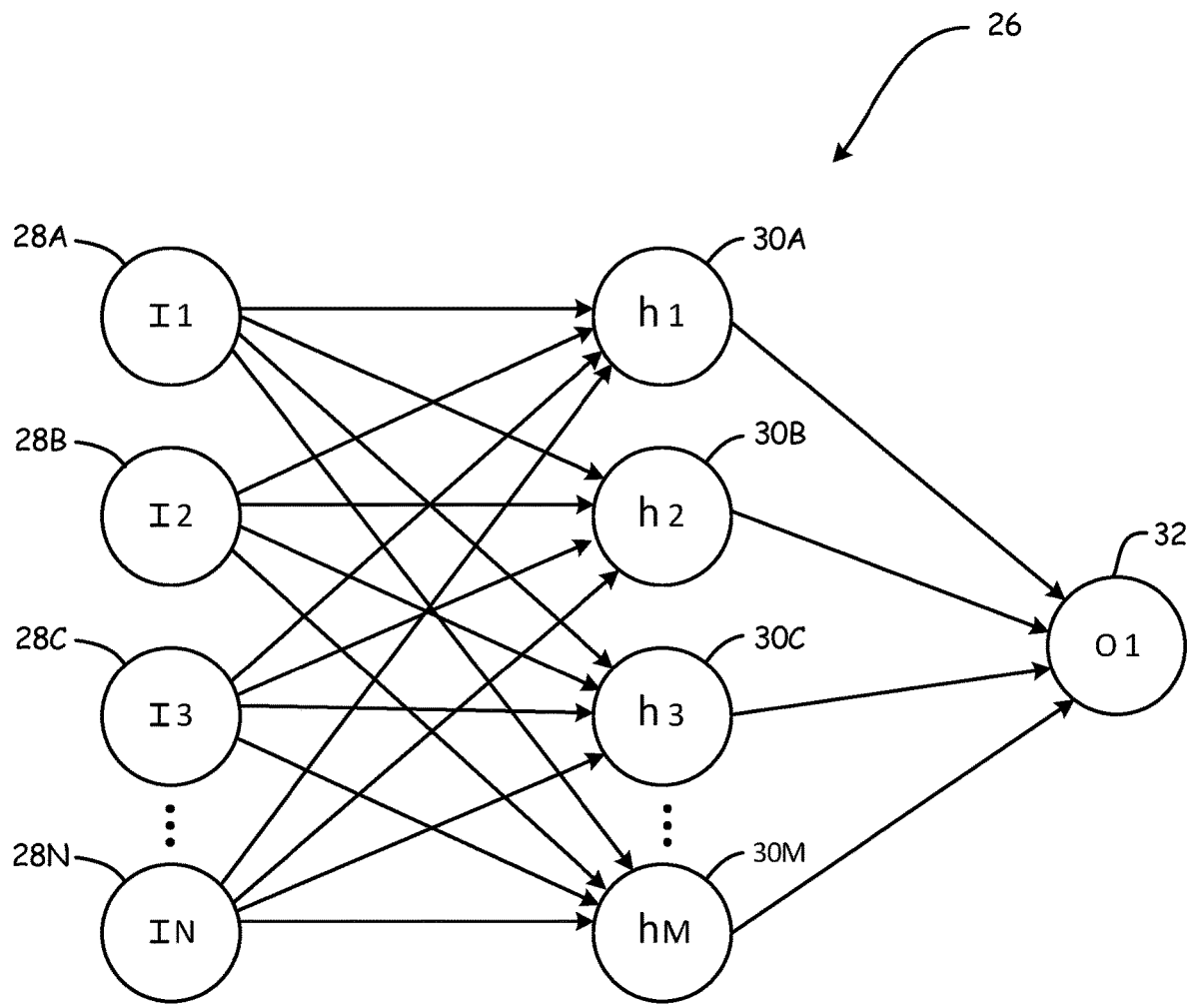
FIG. 2 is a schematic diagram of an example artificial neural network that can be used to process non-pneumatic inputs to generate one or more air data output values.

FIG. 2 is a schematic diagram of an example artificial neural network 26 that can be used to process non-pneumatic inputs to generate one or more air data output values. For purposes of clarity and ease of discussion, the example artificial neural network 26 of FIG. 2 is described below within the context of aircraft 10 including synthetic air data system 12 of FIG. 1.

As illustrated in FIG. 2, artificial neural network 26 includes input nodes 28A-28N (collectively referred to herein as "inputs 28"), internal nodes (or neurons) 30A-30M (collectively referred to herein as "neurons 30" and often referred to as a hidden layer), and output node 32. It should be understood that in the example of FIG. 2, the letter "N" of input node 28N and the letter "M" of internal node 30M represent arbitrary numbers, such that each of inputs 28 and neurons 30 can include any number of input nodes and internal nodes, respectively. In certain examples, artificial neural network 26 includes a number of neurons 30 that is one less than the number of inputs 28. That is, while the letter "N" of input node 28N represents an arbitrary number, in some examples, the letter "M" of internal node "30M" represents a number that is one less than the arbitrary number represented by the letter "N".

Each of inputs 28 corresponds to one of the plurality of non-pneumatic inputs received from producing systems 18, though in examples where synthetic air data system 12 processes pneumatic-based air data outputs received from air data computers 16, certain of inputs 28 can correspond to the received pneumatic-based air data outputs. Each of neurons 30 applies a weight, bias, and transfer function (e.g., a sigmoid function) to each of inputs 28 to generate intermediate outputs provided by neurons 30. In the illustrated example of FIG. 2, the intermediate outputs provided by neurons 30 are provided as inputs to output node 32. Output node 32 applies predetermined weights, biases, and/or a transfer function to the intermediate outputs to generate a particular air data output value (e.g., calibrated airspeed, true airspeed, Mach number, pressure altitude, angle of attack, angle of sideslip, or other air data output values).

In the example of FIG. 2, artificial neural network 26 processes inputs 28 to generate a single air data output value at output node 32. However, in other examples, artificial neural network 26 can process inputs 28 to determine multiple air data outputs (i.e., at multiple output nodes). In certain examples, artificial neural network 26 can represent a first artificial neural network that correlates a first set of inputs (e.g., inputs 28) to a first air data output value (e.g., at output node 32). In such examples, synthetic air data system 12 (of FIG. 1) can utilize a second artificial neural network that correlates a second set of inputs to a second, different air data output value by utilizing different weights, biases, and transfer functions at neurons 30. The first set of inputs (e.g., inputs 28) can be the same or different than the second set of inputs.

As an example, synthetic air data system 12 can utilize artificial neural network 26 that generates a first air data output value (e.g., angle of attack) at output node 32 using a first set of non-pneumatic inputs corresponding to inputs 28 and a first set of weights, biases, and transfer functions at neurons 30. Synthetic air data system 12 can utilize a second artificial neural network (e.g., of the same architectural form of neural network 26) that generates a second air data output value (e.g., angle of sideslip) at the output node using a second set of non-pneumatic inputs and a second set of weights, biases, and transfer functions at the hidden layer of neurons. The second set of non-pneumatic inputs (utilized to generate an angle of sideslip air data output value) can be the same set of non-pneumatic inputs as the first set of non-pneumatic inputs or a different set of non-pneumatic inputs.

In some examples, synthetic air data system 12 can store multiple artificial neural networks that are each usable to generate a same category of air data output value (e.g., angle of sideslip, angle of attack, calibrated airspeed, or other categories of air data output value). The multiple artificial neural networks can utilize different sets of inputs and different weights, biases, and transfer functions to generate the same category of air data output value. Synthetic air data system 12, in such examples, can select which of the multiple artificial neural networks to utilize to generate the category of air data output value based on an availability and/or determined reliability of inputs to the multiple artificial neural networks. For instance, synthetic air data system 12 can receive and/or determine a reliability and/or accuracy status of each of the inputs to each of the multiple artificial neural networks. Synthetic air data system 12 can select, e.g., a first of the multiple artificial neural networks for use in generating the category of air data output value. In the event that one or more of the inputs to the selected first of the multiple artificial neural networks is determined to be unreliable (or inaccurate) and each of the inputs to a second of the artificial neural networks is determined to be reliable (and accurate), synthetic air data system 12 can select the second of the multiple artificial neural networks for use in generating the category of air data output value. In this way, synthetic air data system 12 can increase robustness of air data output generation by enabling an air data output value to be generated based on any of multiple, different sets of non-pneumatic inputs.

While the example artificial neural network 26 of FIG. 2 is illustrated as a feed-forward neural network including a single hidden layer of neurons 30, in some examples, artificial neural network 26 can take the form of a recurrent neural network in which connections between units (e.g., inputs 28, neurons 30, and/or output node 32) form a directed cycle that enables artificial neural network 26 to store internal states of each of the nodes to thereby model dynamic temporal behavior. In addition, in some examples, artificial neural network 26 can include two or more layers of neurons 30.

As described herein, artificial neural network 26, implemented by synthetic air data system 12, can be used to generate one or more air data output values based on non-pneumatic inputs received from various producing systems of an aircraft. The use of non-pneumatic inputs can provide air data output values that are usable during operation of the aircraft (e.g., for controlled flight) and that are generated via a system that is dissimilar in design to pneumatic-based air data systems. Accordingly, the use of air data output values generated by synthetic air data system 12 via artificial neural network 26 can help to increase the operational reliability of the aircraft by increasing the chance that an environmental or other condition that may cause anomalous behavior of the pneumatic-based air data system does not adversely affect synthetic air data system 12.

Figure 3:
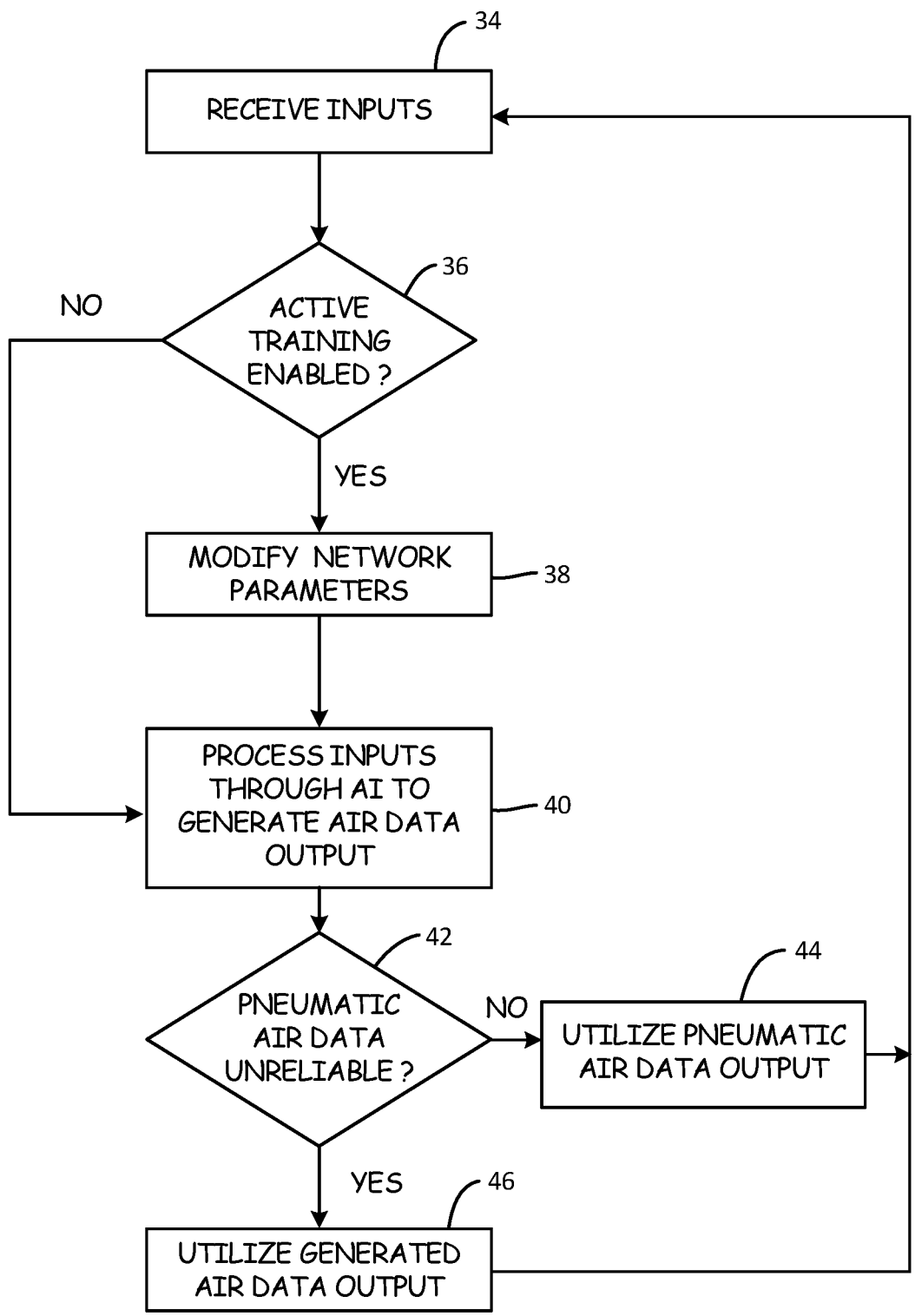
FIG. 3 is a flow diagram illustrating example operations to process non-pneumatic inputs through an artificial intelligence network to generate one or more air data output values.

FIG. 3 is a flow diagram illustrating example operations to process non-pneumatic inputs through an artificial intelligence network to generate one or more air data output values. For purposes of clarity and ease of discussion, the example operations are described below within the context of aircraft 10 of FIG. 1 and artificial neural network 26 of FIG. 2.

A plurality of non-pneumatic inputs can be received (step 34). For example, synthetic air data system 12 can receive a plurality of non-pneumatic inputs generated by producing systems 18 via data concentrator unit 22 and over communications data bus 24. It can be determined whether active training of an artificial intelligence network is enabled (step 36). For instance, synthetic air data system 12 can determine whether an active training mode of artificial neural network 26 is enabled. In examples where the active training is enabled ("YES" branch of step 36), parameters of the artificial intelligence network can be modified based on, e.g., feedback values of generated air data output values and/or a received reference value, such as a corresponding pneumatic-based air data output value (step 38). In examples where the active training is not enabled ("NO" branch of step 36), the step of modifying the parameters of the artificial intelligence network can be omitted (or skipped).

The plurality of non-pneumatic inputs can be processed through the artificial intelligence network to generate an air data output value (step 40). For example, synthetic air data system 12 can process a plurality of non-pneumatic inputs through artificial neural network 26 to generate an air data output value at output node 32.

It can be determined whether a pneumatic-based air data output value is unreliable (step 42). For instance, any one or more of consuming systems 20 can determine whether a pneumatic-based air data output value generated by air data computers 16 is reliable, or whether the pneumatic-based air data output value is unreliable. In examples where the pneumatic-based air data output value is not determined to be unreliable ("NO" branch of step 42), the pneumatic-based air data output value can be utilized for operation, such as for controlled flight of aircraft 10 (step 44). In examples where the pneumatic-based air data output value is determined to be unreliable ("YES" branch of step 42), the air data output value generated by synthetic air data system 12 can be utilized for operation, such as for controlled flight of aircraft 10 (step 46). For instance, in certain examples, air data output values generated by one or more different (e.g., primary) system(s) can be utilized for flight, and the air data output value generated by synthetic air data system 12 can be used as a backup air data output value in response to a determination that the air data output values generated by the one or more primary systems are unreliable.

While the example operations described above include step 36 in which it is determined whether active training of the artificial intelligence network is enabled, other example operations may not include step 36. For instance, as when the artificial neural network is adapted such that active training is unavailable, synthetic air data system 12 may not actively determine whether active training is enabled. Rather, synthetic air data system 12 may proceed directly to step 40 in response to receiving the plurality of non-pneumatic inputs. Similarly, in examples where the artificial neural network is adapted such that active training is always enabled, synthetic air data system 12 may proceed directly to step 38 in response to receiving the plurality of non-pneumatic inputs without actively determining whether active training is enabled.

According to techniques of this disclosure, a synthetic air data system can process a plurality of non-pneumatic inputs corresponding to aircraft operational parameters through an artificial intelligence network to generate one or more air data output values. The synthetic air data system can output the one or more air data output values for use when, e.g., a pneumatic-based air data output value is determined to be unreliable. Accordingly, a synthetic air data system as described herein can provide a source of generated air data output values for consuming systems that is dissimilar in design to traditional pneumatic-based air data systems, thereby helping to enhance aircraft operational reliability.

The following are non-exclusive descriptions of possible embodiments of the present invention.

A method includes receiving, over an aircraft data communications bus, a plurality of non-pneumatic inputs corresponding to aircraft operational parameters. The method further includes processing the plurality of non-pneumatic inputs through an artificial intelligence network to generate an air data output value, and outputting the air data output value to a consuming system for use when a pneumatic-based air data output value is determined to be unreliable.

The method of the preceding paragraph can optionally include, additionally and/or alternatively, any one or more of the following features, configurations, operations, and/or additional components.

The plurality of non-pneumatic inputs can include one or more of an aircraft engine thrust parameter, an aircraft engine throttle setting, a flight control surface position, a flight control surface loading, an aircraft fuel usage rate, an aircraft weight, a landing gear position, an aircraft mass balance, an aircraft acceleration, and an aircraft angular rate.

The generated air data output value can be selected from a group including an aircraft calibrated airspeed, an aircraft true airspeed, an aircraft Mach number, an aircraft pressure altitude, an aircraft angle of attack, an aircraft vertical speed, and an aircraft angle of sideslip.

The artificial intelligence network can include an artificial neural network having at least one internal layer of neurons that apply one or more weights, biases, or transfer functions to each of the plurality of non-pneumatic inputs to generate the air data output value.

The artificial neural network can be a feed-forward neural network.

The artificial neural network can be pre-trained to determine the one or more weights, biases, or transfer functions.

Processing the plurality of non-pneumatic inputs through the artificial intelligence network to generate the air data output value can include processing the plurality of non-pneumatic inputs through the artificial neural network without changing the one or more weights, biases, or transfer functions.

The pre-trained artificial neural network can modify the one or more weights, biases, or transfer functions based on the plurality of non-pneumatic inputs corresponding to the aircraft operational parameters.

The method can further include receiving the pneumatic-based air data output value from a pneumatic-based air data system, and identifying whether the received pneumatic-based air data output value is determined to be reliable or whether the received pneumatic-based air data output value is determined to be unreliable. Processing the plurality of non-pneumatic inputs through the artificial intelligence network to generate the air data output value can further include processing the non-pneumatic inputs and the received pneumatic-based air data output value through the artificial intelligence network to generate the air data output value when the received pneumatic-based air data output value is determined to be reliable, and processing the non-pneumatic inputs without the received pneumatic-based air data output value through the artificial intelligence network to generate the air data output value when the received pneumatic-based air data output value is determined to be unreliable.

The method can further include outputting the air data output value to a consuming system that determines whether the pneumatic-based air data output value is unreliable based at least in part on the generated air data value.

The method can further include determining whether the pneumatic-based air data output value is unreliable.

A synthetic air data system includes at least one processor and computer-readable memory. The computer-readable memory is encoded with instructions that, when executed by the at least one processor, cause the synthetic air data system to receive, over an aircraft data communications bus, a plurality of non-pneumatic inputs corresponding to aircraft operational parameters. The computer readable memory is further encoded with instructions that, when executed by the at least one processor, cause the synthetic air data system to process the plurality of non-pneumatic inputs through an artificial intelligence network to generate an air data output value, and output the air data output value to a consuming system for use when a pneumatic-based air data output value is determined to be unreliable.

The synthetic air data system of the preceding paragraph can optionally include, additionally and/or alternatively, any one or more of the following features, configurations, operations, and/or additional components.

The plurality of non-pneumatic inputs can include one or more of an aircraft engine thrust parameter, an aircraft engine throttle setting, a flight control surface position, a flight control surface loading, an aircraft fuel usage rate, an aircraft weight, a landing gear position, an aircraft mass balance, an aircraft acceleration, and an aircraft angular rate.

The computer-readable memory can be encoded with instructions that, when executed by the at least one processor, cause the synthetic air data system to process the plurality of non-pneumatic inputs through the artificial intelligence network to generate the air data output value that is selected from a group comprising an aircraft calibrated airspeed, an aircraft true airspeed, an aircraft Mach number, an aircraft pressure altitude, an aircraft angle of attack, an aircraft vertical speed, and an aircraft angle of sideslip.

The computer-readable memory can be encoded with instructions that, when executed by the at least one processor, cause the synthetic air data system to process the plurality of non-pneumatic inputs through a pre-trained artificial neural network having at least one internal layer of neurons that apply one or more weights, biases, or transfer functions to each of the plurality of non-pneumatic inputs to generate the air data output value.

The computer-readable memory can be encoded with instructions that, when executed by the at least one processor, cause the synthetic air data system to process the plurality of non-pneumatic inputs through the pre-trained artificial intelligence network to generate the air data output value without changing the one or more weights, biases, or transfer functions.

The computer-readable memory can be encoded with instructions that, when executed by the at least one processor, cause the synthetic air data system to process the plurality of non-pneumatic inputs through the pre-trained artificial neural network to generate the air data output value by modifying the one or more weights, biases, or transfer functions based on the plurality of non-pneumatic inputs corresponding to the aircraft operational parameters.

The computer-readable memory can be further encoded with instructions that, when executed by the at least one processor, cause the synthetic air data system to receive the pneumatic-based air data output value from a pneumatic-based air data system, and identify whether the received pneumatic-based air data output value is determined to be reliable or whether the received pneumatic-based air data output value is determined to be unreliable. The computer-readable memory can be encoded with instructions that, when executed by the at least one processor, cause the synthetic air data system to process the plurality of non-pneumatic inputs through the artificial intelligence network to generate the air data output value by at least causing the synthetic air data system to process the non-pneumatic inputs and the received pneumatic-based air data output value through the artificial intelligence network to generate the air data output value when the received pneumatic-based air data output value is determined to be reliable, and process the non-pneumatic inputs without the received pneumatic-based air data output value through the artificial intelligence network to generate the air data output value when the received pneumatic-based air data output value is determined to be unreliable.

The computer-readable memory can be further encoded with instructions that, when executed by the at least one processor, cause the synthetic air data system to output the air data output value to a consuming system that determines whether the pneumatic-based air data output value is unreliable based at least in part on the generated air data value.

The computer-readable memory can be further encoded with instructions that, when executed by the at least one processor, cause the synthetic air data system to determine whether the pneumatic-based air data output value is unreliable.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method comprising:
receiving, over an aircraft data communications bus, a plurality of non-pneumatic inputs;
processing the plurality of non-pneumatic inputs through an artificial intelligence network to generate a first air data output value without changing any one or more of first weights, biases, or transfer functions of the artificial intelligence network;
outputting the first air data output value to a consuming system;
processing the plurality of non-pneumatic inputs through the artificial intelligence network by applying second weights, biases, and transfer functions to generate a second air data output value; and
outputting the second air data output value to the consuming system.

2. The method of claim 1, further comprising:
determining whether a pneumatic-based air data output value is unreliable;
wherein outputting the first air data output value to the consuming system comprises outputting the first air data output value to the consuming system in response to determining that the pneumatic-based air data output value is unreliable.

3. The method of claim 1, wherein the artificial intelligence network comprises a first artificial intelligence network, wherein the plurality of non-pneumatic inputs comprises a first plurality of non-pneumatic inputs, the method further comprising:
processing a second plurality of non-pneumatic inputs through the second artificial intelligence network to generate a third air data output value; and
outputting the third air data output value to the consuming system.

4. The method of claim 3,
wherein the first plurality of non-pneumatic inputs is different than the second plurality of non-pneumatic inputs.

5. The method of claim 1,
wherein the artificial intelligence network is pre-trained to determine the first weights, biases, and transfer functions.

6. The method of claim 1,
wherein the artificial intelligence network comprises an artificial neural network having at least one internal layer of neurons that apply the first weights, biases, and transfer functions to the plurality of non-pneumatic inputs.

7. The method of claim 1,
wherein the plurality of non-pneumatic inputs comprise one or more of an aircraft engine thrust parameter, an aircraft engine throttle setting, a flight control surface position, a flight control surface loading, an aircraft fuel usage rate, an aircraft weight, a landing gear position, an aircraft mass balance, an aircraft acceleration, and an aircraft angular rate.

8. The method of claim 1,
wherein the generated first air data output value is selected from a group comprising an aircraft calibrated airspeed, an aircraft true airspeed, an aircraft Mach number, an aircraft pressure altitude, an aircraft angle of attack, an aircraft vertical speed, and an aircraft angle of sideslip.

9. The method of claim 1, further comprising:
receiving a pneumatic-based air data output value from a pneumatic-based air data system; and
identify whether the received pneumatic-based air data output value is determined to be reliable or whether the received pneumatic-based air data output value is determined to be unreliable;
wherein processing the plurality of non-pneumatic inputs through the artificial intelligence network to generate the first air data output value further comprises:
processing the non-pneumatic inputs and the received pneumatic-based air data output value through the artificial intelligence network to generate the first air data output value when the received pneumatic-based air data output value is determined to be reliable; and processing the non-pneumatic inputs without the received pneumatic-based air data output value through the artificial intelligence network to generate the first air data output value when the received pneumatic-based air data output value is determined to be unreliable.

10. An air data system comprising:

at least one processor; and non-transitory computer-readable memory encoded with instructions that, when executed by the at least one processor, cause the air data system to:

receive, over an aircraft data communications bus, a plurality of non-pneumatic inputs;

process the plurality of non-pneumatic inputs through an artificial intelligence network to generate a first air data output value without changing any one or more of first weights, biases, or transfer functions of the artificial intelligence network;

output the first air data output value to a consuming system;

process the plurality of non-pneumatic inputs through the artificial intelligence network by applying second weights, biases, and transfer functions to generate a second air data output value; and output the second air data output value to the consuming system.

11. The air data system of claim 10, wherein the computer-readable memory is further encoded with instructions that, when executed by the at least one processor, cause the air data system to:

determine whether a pneumatic-based air data output value is unreliable; and output the first air data output value to the consuming system in response to determining that the pneumatic-based air data output value is unreliable.

12. The air data system of claim 10, wherein the artificial intelligence network comprises a first artificial intelligence network, wherein the plurality of non-pneumatic inputs comprises a first plurality of non-pneumatic inputs, and wherein the computer-readable memory is further encoded with instructions that, when executed by the at least one processor, cause the air data system to:

process a second plurality of non-pneumatic inputs through the second artificial intelligence network to generate a third air data output value; and output the third air data output value to the consuming system.

13. The air data system of claim 12, wherein the first plurality of non-pneumatic inputs is different than the second plurality of non-pneumatic inputs.

14. The air data system of claim 10, wherein the artificial intelligence network is pre-trained to determine the first weights, biases, and transfer functions.

15. The air data system of claim 10, wherein the artificial intelligence network comprises an artificial neural network having at least one internal layer of neurons that apply the first weights, biases, and transfer functions to the plurality of non-pneumatic inputs.

16. The air data system of claim 10, wherein the plurality of non-pneumatic inputs comprise one or more of an aircraft engine thrust parameter, an aircraft engine throttle setting, a flight control surface position, a flight control surface loading, an aircraft fuel usage rate, an aircraft weight, a landing gear position, an aircraft mass balance, an aircraft acceleration, and an aircraft angular rate.

17. The air data system of claim 10, wherein the generated first air data output value is selected from a group comprising an aircraft calibrated airspeed, an aircraft true airspeed, an aircraft Mach number, an aircraft pressure altitude, an aircraft angle of attack, an aircraft vertical speed, and an aircraft angle of sideslip.

18. The air data system of claim 10, wherein the computer-readable memory is further encoded with instructions that, when executed by the at least one processor, cause the air data system to:

receive a pneumatic-based air data output value from a pneumatic-based air data system;

identify whether the received pneumatic-based air data output value is determined to be reliable or whether the received pneumatic-based air data output value is determined to be unreliable;

process the non-pneumatic inputs and the received pneumatic-based air data output value through the artificial intelligence network to generate the first air data output value when the received pneumatic-based air data output value is determined to be reliable; and process the non-pneumatic inputs without the received pneumatic-based air data output value through the artificial intelligence network to generate the first air data output value when the received pneumatic-based air data output value is determined to be unreliable.

19. A method comprising:

receiving, over an aircraft data communications bus, a plurality of non-pneumatic inputs;

receiving a pneumatic-based air data output value from a pneumatic-based air data system;

identifying whether the received pneumatic-based air data output value is determined to be reliable or whether the received pneumatic-based air data output value is determined to be unreliable;

processing, when the received pneumatic-based air data output value is determined to be reliable, the plurality of non-pneumatic inputs and the received pneumatic-based air data output value through an artificial intelligence network to generate an air data output value without changing any one or more of weights, biases, or transfer functions of the artificial intelligence network;

processing, when the received pneumatic-based air data output value is determined to be unreliable, the plurality of non-pneumatic inputs without the received pneumatic-based air data output value through the artificial intelligence network to generate the air data output value without changing any one or more of the weights, biases, or transfer functions of the artificial intelligence network; and outputting the air data output value to a consuming system.

20. An air data system comprising:
at least one processor; and
non-transitory computer-readable memory encoded with instructions that, when executed by the at least one processor, cause the air data system to:
  receive, over an aircraft data communications bus, a plurality of non-pneumatic inputs;
  receive a pneumatic-based air data output value from a pneumatic-based air data system;
  identify whether the received pneumatic-based air data output value is determined to be reliable or whether the received pneumatic-based air data output value is determined to be unreliable;
  process, when the received pneumatic-based air data output value is determined to be reliable, the plurality of non-pneumatic inputs and the received pneumatic-based air data output value through an artificial intelligence network to generate an air data output value without changing any one or more of weights, biases, or transfer functions of the artificial intelligence network;
  process, when the received pneumatic-based air data output value is determined to be unreliable, the plurality of non-pneumatic inputs without the received pneumatic-based air data output value through the artificial intelligence network to generate the air data output value without changing any one or more of the weights, biases, or transfer functions of the artificial intelligence network; and
  output the air data output value to a consuming system.

* * * * *